Patented Apr. 25, 1933

1,906,203

UNITED STATES PATENT OFFICE

WILLIAM McAFEE BRUCE, OF NEW YORK, N. Y., ASSIGNOR TO THE PERMUTIT COMPANY, OF NEW YORK, N. Y., A CORPORATION OF DELAWARE

MANUFACTURE OF WATER-SOFTENING ZEOLITES

No Drawing.    Application filed October 10, 1930.    Serial No. 487,918.

This invention relates to manufacture of water-softening zeolites; and it comprises a process of making a composite zeolite gel utilizing alkali silicates and both acid and alkali alumina compounds wherein one silicate solution is mixed with aluminum sulfate solution, another silicate solution is mixed with sodium aluminate solution, and the two mixtures are combined, the ratio of silica in the product being adjusted by adjusting the proportions of silicate treated respectively with sulfate and with aluminate and the final mixture being made definitely alkaline; all as more fully hereinafter set forth and as claimed.

One way of making zeolites, or base exchange silicates, for water softening utilizes gelatinous precipitates containing silica, alumina and alkali (usually soda). A solution of sodium silicate, (commercial water glass) mixed with a solution of sodium aluminate forms a precipitate. According to the dilution, the precipitate may form a gelatinous mass separating from the liquid or may embrace the entire volume of liquid; be a jelly or a full volume gel. The precipitate is washed and dried or dried and washed, to make a granular material useful for softening water. In the art the dried final granular material is also called a "gel".

In these wet methods, in order to work with less volumes of liquid it is desirable to use solutions as concentrated as is consistent with obtaining uniform and intimate admixture before gelling. If admixture is not complete prior to gelling, the product will not be uniform and usually exhibits chalky spots where premature curding has occurred.

In order to produce a dry preparation, it is the best practice to press the gel, expressing as much mother liquor as possible prior to drying. Removing water by drying is more expensive than pressing. Expression may be in an ordinary hydraulic press or in a filter press; the gel in the latter event being cut up enough to render it pumpable.

After drying, the press cake is placed in water which removes the alkali and salts of the mother liquor and causes a sort of decrepitation, reducing the cake to granules of the right size for use in a softener.

In the described precipitation, the gel carries with it in fixed form about 1 molecule of $Na_2O$ for each molecule of $Al_2O_3$, the rest of the soda remaining in solution. The proportion of silica carried down is variable, the silica distributing itself in some proportion between the liquid phase and the solid phase. The greater the alkalinity of the liquid the more silica remains in solution and since the alkalinity of the mother liquor increases in drying, there is a change in the composition of the solid phase due to this. Insofar as silica and caustic soda remain in solution and are washed out finally, they represent a loss of silicate of soda.

In another mode of operation, in lieu of treating sodium silicate with sodium aluminate it is treated with aluminum sulfate, the amount of the latter being not great enough to give acidity to the final mother liquor. Because of the cheapness of aluminum sulfate and because there is little waste of caustic soda or silica this is an economic process. It however, has the disadvantage that when using the usual commercial grades of materials it is only possible to make preparations with a high silica ratio. In general, the high silica zeolites are not so satisfactory in water-softening as those containing less silica.

In a prior and copending application, Serial No. 308,888, filed September 27, 1928, I have described and claimed an economical combination process in which a gel zeolite is formed from sodium silicate reacting with both aluminum sulfate and sodium aluminate, a sulfate solution being first mixed with a silicate solution and an aluminate solution being added to the mixture before precipitation or gelation. In the process of said prior application the proportions of the three reagents are such that the sum of the soda of the silicate and aluminate is sufficient to neutralize the acid of the sulfate and to provide in addition at least one mol $Na_2O$ for each mol $Al_2O_3$ in the three solution mixture. In this process it is economical and advantageous generally to so proportion the silicate to the sulfate as to provide a mol of $Na_2O$ for each mol $Al_2O_3$ in the sulfate in addition to the $Na_2O$ required to neutralize the acid and then to add aluminate containing equimolar proportions of $Na_2O$ and $Al_2O_3$ in a proportion to give a moderate silica ratio in the final product, say between 5 and 7 mols $SiO_2$ to one each of $Al_2O_3$ and $Na_2O$. So doing, it is advantageous to use commercial sodium aluminate. This usually contains a little alkali over the equimolar ratio to the alumina and this provides a small excess of $Na_2O$ in the final mixture. In effect, the addition of the usual commercial aluminate ($Na_2Al_2O_4$) dilutes the high silica ratio in the product which is inherent in forming an alkaline zeolite gel from commercial aluminum sulfate and the usual commercial water glass containing silica and soda in a molecular ratio approximating 3.3:1. This process produces an excellent zeolite of high base exchange capacity and desirable physical properties with economy in the use of chemicals and but slight mother liquor loss of alkali and silica.

It has been found that the combination process of said prior application can be varied widely both as to reagent proportions and as to method of procedure and that in these variations the general advantages of treating sodium silicate with both aluminum sulfate and sodium aluminate are retained and certain new advantages are secured. In particular it has been found possible, in so varying the procedure, to work with reagent solutions of greater concentrations than heretofore and thus to lessen the amount of mother liquor required to be removed from the gels in pressing and drying.

In one variation of procedure under the present invention, a solution of sodium silicate is mixed with a solution of aluminum sulfate, another solution of sodium silicate is mixed with a solution of sodium aluminate, the first mixture is then mixed with the second mixture, and the final mixture is allowed to set to a jelly, which is afterwards pressed and dried in the usual way. By slowly adding the sulfate solution to the silicate solution with constant rapid stirring a mixture of these solutions is obtained which does not form a precipitate for a considerable time even when the concentrations of the two admixed solutions are relatively high. A separate non-gelling or non-precipitating mixture of silicate and aluminate solutions is made by adding the aluminate solution rapidly to the silicate solution with brisk stirring, whereupon the sulfate-silicate mixture is stirred in and the whole is allowed to gel. The gel is formed in a few minutes and after standing for some time it may be pressed, dried, granulated, washed and finished in usual ways. Pressing is not always necessary since the mass can be dried as it is; but it is cheaper and quicker to expel some mother liquor by pressing.

It has been found that the aluminate-silicate mixture can be made from relatively strong solutions without adversely affecting the product and that no harm results if some precipitation occurs before the addition of the sulfate-silicate mixture to the aluminate-silicate mixture is complete. In effect, the process of the present invention is to make a composite zeolite gel from sulfate and silicate and from aluminate and silicate. Whether this composite zeolite is simply a physical mixture or intercombination takes place is here not material. The sulfate zeolite is usually of a potentially high silica content, the aluminate zeolite potentially lower in silica and the resulting gel product is intermediate of the two in silica ratio. By choosing for a given amount of silicate the relative proportion of the sulfate and aluminate used in separate admixture with portions of the silicate, the final product is a zeolite gel of the desired silica ratio within limits depending upon the composition of the materials used. Decrease of the silica ratio in the zeolite increases its total base exchange capacity.

The proportions of the three reagents can be varied within rather wide limits, but to obtain a product having a good water softening capacity, it has been found necessary to always have a sufficiency of alkali in the final mixture of solutions. In order to have sufficient alkali present, it is necessary to have the sum of the soda ($Na_2O$) content of the silicate and aluminate in excess of the total amount required to neutralize the acid ($SO_3$) of the sulfate and to supply in addition one mol $Na_2O$ for each mol $Al_2O_3$ in the final mixture. Observing this requirement as to alkali, the relative proportions of sulfate and aluminate, on the basis of their respective alumina contents, can be adjusted to give in the final mixture and in the gel produced a ratio of silica to alumina and soda as desired. For most water softening purposes it has been found that a gel formed from both alkaline and acid compounds of alumina should contain for the best results a ratio for one each of $Na_2O$ and $Al_2O_3$ of between 5 and 7 mols $SiO_2$; that is 1:1:5 to 7. Within these limits of silica ratio the finished gel possesses a combination of high base exchange activity with physical ruggedness. To obtain a product of such a silica ratio, it is desirable to work with reagents of certain more or less definite composition. The process is particularly adapted to the use of commercial sodium silicate or water glass which usually contains silica and soda in molecular proportions of 3.3 to 3.4 mols $SiO_2$ to one of $Na_2O$.

A fully alkaline zeolite gel formed from such a sodium silicate by precipitation with commercial aluminum sulfate containing usually from 2.7 to 2.9 mols $SO_3$ per mol $Al_2O_3$, observing the excess alkali requirement as above specified, necessarily contains silica in a ratio of at least 13 mols $SiO_2$; that is, 1:1:13. Silicate-aluminate gels have silica ratios ranging between 1 and 7, varying directly with the proportion of silicate used. In the combination process, working with both sulfate and aluminate, it is possible to proportion the sulfate and aluminate on the basis of their respective alumina contents so that the final mixture of reagents and the final gel product may have any desired silica content ranging between 1:1:1 and 1:1:13. In this process it is preferable to use an aluminate of relatively low alkali content and the process is particularly adapted for the use of a common commercial grade of sodium aluminate containing 50 per cent or more alumina and corresponding nearly to the formula $Na_2Al_2O_4$, having one mol $Na_2O$ for each mol $Al_2O_3$ and containing a very small excess of alkali over this ratio. Using such an aluminate in working with mixed mixtures of silicate with both sulfate and aluminate, as described, it has been found possible to complete the final mixture of mixes before precipitation or gelation takes place to any substantial extent and, so doing, it has been found possible to use solutions of considerably greater concentrations than are usually practicable when working with a mixture of three solutions of the three reagents separately. In the silicate-aluminate mixture both silicate and aluminate solutions may be of 8 to 10° Bé. gravity. The sulfate solution may be from 5 to 6° Bé. gravity and the silicate solution mixed with the sulfate solution may be from 3 to 5° Bé. With solutions of such concentrations a uniform mixture of two non-gelling mixtures can be obtained before jellification of the whole and the gel produced is of great uniformity.

In making a composite zeolite gel from both sulfate and aluminate according to the present invention, several modifications of procedure are possible. It has been found desirable in many cases to maintain a substantial degree of alkalinity in both reagent mixtures during the mixing operations. Usually a mixture of silicate and sulfate solutions is made by gradually adding a sulfate solution to a silicate solution in such proportions that the mixture contains an excess of silica and alkali. The separate mixture of aluminate and silicate solutions is in any case highly alkaline and it has been found advantageous to make this mixture by rapidly adding an 8° Bé. aluminate solution to an 8° Bé. silicate solution with violent agitation. Then the sulfate mixture is stirred into the aluminate mixture. It is however possible to get good results as to economy and quality of product by using a unitary silicate solution and stirring into it first the sulfate solution and then the aluminate solution. In the latter mode of working, the silicate solution may be relatively dilute and consequently the later dewatering step may be somewhat more expensive than when a separate mixture of aluminate and silicate is made. Also in this mode of working, the quantity of sulfate first added to the silicate may be sufficient to leave the silicate-sulfate mixture non-alkaline, that is, to have this mixture contain less soda than that required to supply 1 mol $Na_2O$ for each mol $Al_2O_3$ in the sulfate in addition to that needed to neutralize the acid of the sulfate with formation of $Na_2SO_4$; and in this case the alkali needed to provide in the final mixture an excess over the equimolar proportion with the total alumina can be provided by using a high alkali aluminate, one containing, say, 2 or more mols $Na_2O$ per mol $Al_2O_3$. So working, the sulfate-silicate mixture contains a deficiency of soda and this is made up by using, for example, an aluminate of the composition $Na_2Al_2O_5$ or $Na_3Al_2O_3$. This modification of method has the advantage of utilizing a greater proportion of aluminum sulfate as the source of alumina for the composite zeolite.

To adjust the ratio of silica in the final product it is only necessary to choose the proportions of sulfate and aluminate with which a given quantity of silicate is treated. For example, in making a zeolite having a ratio of $Na_2O:Al_2O_3:7SiO_2$ from commercial water glass or a batch of silicate of soda solution containing 2452 pounds $SiO_2$ and 762 pounds $Na_2O$, the solution may be used in two portions containing respectively 55 and 45 per cent of the whole. To the first portion, diluted to 4° Bé. is added a 5° Bé. solution of commercial aluminum sulfate containing 121 pounds $Al_2O_3$ and 254 pounds $SO_3$ and to the second portion, diluted to 8° Bé. is added a 8° Bé. solution of sodium aluminate containing 467 pounds $Al_2O_3$ and 284 pounds $Na_2O$. The first or silicate-sulfate mixture is alkaline to methyl orange. As soon as the second mixture is completed, the first mixture is stirred into it and the whole is allowed to set to a firm gel which is finished in the usual way. In this example, it will be noted, the alumina is supplied by the sulfate and the aluminate in a ratio of 1 to 4, the silica ratio of the final mixture being about 7. The silica ratio is increased by using the same amount of water glass with more sulfate and less aluminate. With less sulfate and more aluminate the silica content of the product is decreased. Ordinarily, it is an object to have the silica ratio in the range between 5 and 7. Variation within this range is readily and conveniently effected by changing the relative proportions of silicate respectively treated with sulfate and with aluminate.

In a modified method of adjusting the silica ratio of the zeolite produced, aluminum sulfate is used as the major source of alumina for the zeolite and a part of the sodium aluminate is replaced by caustic soda. Ammonia may be used instead of soda. Other alkalis such as lime and baryta are also applicable. A single body of silicate solution is treated portionwise with sulfate and with aluminate and caustic soda, the reaction mixture being kept strongly alkaline at all times. Sulfate solution is added, then aluminate and caustic, then more sulfate. In this modified method it is possible to entirely avoid the purchase or separate preparation of sodium aluminate and to obtain all the required alumina from sulfate, the effect being the same as if alumina were formed in place by reaction of aluminum sulfate with caustic soda. So doing, the sulfate and caustic are advantageously added alternately and portionwise to a silicate solution, so that the reaction mixture is alkaline at all times. The final effect upon the silica ratio of the product is that of partly neutralizing the acid of the sulfate with caustic soda. The silica ratio of the product is adjusted according to the relative amount of caustic used. For example, for the same amount of silicate as in the former example, containing 2452 pounds $SiO_2$ and 762 pounds $Na_2O$ an amount of aluminum sulfate containing 694 pounds $Al_2O_3$ and 1457 pounds $SO_3$ is used, together with caustic soda equivalent to 800 pounds $Na_2O$. The silicate solution should be diluted to about 4° Bé. and the sulfate to 6 or 7° Bé. The caustic may be used in about 2 percent solution. About half the sulfate solution is stirred into the silicate solution which leaves the mixture still alkaline. Then the dissolved caustic and the dissolved sulfate are added in equivalent alternate portions, taking care to keep all parts of the reaction mixture alkaline at all times. Gelation may begin before the mixture is complete but constant agitation makes the mixture after the final addition of sulfate a smooth, uniform, gelatinous mixture. This may be pressed immediately or allowed to set to a firm full volume jelly. The product obtained after pressing, drying, granulating and washing has a silicate ratio of about 1:1:6, has a good base exchange activity and is durable in water-softening and in regeneration.

In another and still further modification of the process of making composite zeolites, which has the advantage of permitting the use of a more concentrated silicate solution in mixture with the sulfate, a small portion of the silicate in a dilution of 5° Bé. is acidified with sulfuric acid, which makes a colloidal solution of silica. To this a 5° Bé. sulfate solution is added and the mixture is stirred into a 5° Bé. silicate solution. The relative quantities of the materials may be such that the mixture of silicate, acid and sulfate is nearly neutral or there may be an excess of $SO_3$ over the amount required to form $Na_2SO_4$ with the soda of the silicate. This mixture forms a thick creamy mass and it is stirred into a mixture of 8° Bé. solutions of siliate and aluminate. The relative quantities of the two mixtures should be such that the alkali of the silicate-aluminate mixture is more than sufficient to supply soda to the final mixture in a ratio of 1 $Na_2O$ to 1 $Al_2O_3$. The final mixture sets in about 3 minutes to a clear, firm, uniform gel.

In making the composite zeolites as described, it is often advantageous to use stronger solutions and to make two zeolite mixtures separately from sulfate and aluminate by reaction with silicate solution, mixing the two thoroughly prior to complete setting and then allowing the whole to set to a firm jelly. Whether, under these conditions, there is a reaction between the two zeolites with a redistribution of their components is not known. But the product is usually a zeolite of a definite and apparently uniform composition averaged between those of the sulfate and aluminate zeolites of the respective gels.

As stated ante, considerable latitude is allowable in the reagent proportions of the mixed mixtures. In making a sulfate-silicate mixture, for each mol $Al_2O_3$ in the sulfate, from 2 to 6 mols $Na_2O$ with 6.6 to 20 mols $SiO_2$ can be supplied in the silicate. The aluminate-silicate mixture with which the sulfate-silicate mixture is combined may contain from 0.5 to 7 mols $Al_2O_3$ and $Na_2O$ as aluminate for each mol $Al_2O_3$ in the sulfate and from 0.2 to 2 mols $Na_2O$ with 0.8 to 6.6 mols $SiO_2$ supplied by the silicate for each mol $Al_2O_3$ and $Na_2O$ in the aluminate. Working within these limits, it is a comparatively simple matter to meet the requirement of having the final mixture contain some free alkali in addition to that combining with the $SO_3$ of the sulfate to form $Na_2SO_4$ together with that needed to supply one mol $Na_2O$ for each mol $Al_2O_3$ in the mixture. The silica ratio in the final mixture of the two mixtures and hence in the zeolite product is adjusted mainly by adjusting the ratio of aluminate alumina to sulfate alumina. With any two silica ratios in the sulfate and in the aluminate mixtures, the final silica ratio is a matter of the ratio of aluminate alumina to sulfate alumina and this ratio can be adjusted to give the average or intermediate silica ratio desired in the mixed mixtures. While it is possible to have the sulfate mixture on the acid side, that is, containing less than one mol free $Na_2O$ per mol $Al_2O_3$ and to supply the deficiency of soda in the aluminate mixture, it is usually better to have the sulfate mixture itself distinctly alkaline. This involves a necessarily high silica ratio in the sulfate mixture and this ratio is reduced in the final mixture by making the aluminate mixture relatively low in silica. A typical mixture of acid and alkali mixtures is one of a mol of $Al_2O_3$ combined with 2.7 mols $SO_3$ as sulfate and 2.4 mols $Na_2O$ combined with 8 mols $SiO_2$ as silicate mixed with 1.5 mols $Al_2O_3$ with 1.55 mols $Na_2O$ as aluminate and 1.5 mols $Na_2O$ with 5 mols $SiO_2$ as silicate. The sulfate mixture is acid, the aluminate mixture is alkaline and the final mix contains 2.7 $Na_2SO_4$ with 2.75 $Na_2O$, 2.5 $Al_2O_3$ and 13 $SiO_2$ having an excess of 0.25 mols free $Na_2O$. Further typical mixtures are given in the following tabulation showing examples of ratios of sulfate alumina to aluminate alumina and proportions of the total silicate mixed respectively with sulfate and with aluminate:

| | Sulfate mols $Al_2O_3$ | Mix mols $SiO_2$ | Aluminate mols $Al_2O_3$ | Mix mols $SiO_2$ | $Al_2O_3$ ratio | Silicate proportion | Silica ratio of gel |
|---|---|---|---|---|---|---|---|
| I | 1 | 6.5 | 1.5 | 6.0 | 40:60 | 52:48 | 1:1:5 |
| II | 1 | 9 | 1 | 3.5 | 50:50 | 72:28 | 1:1:6.2 |
| III | 1 | 13.2 | 1 | 3 | 54:46 | 81:19 | 1:1:7.3 |

In the various modifications of procedure hereinbefore described, aluminum chlorid can be used instead of aluminum sulfate as the acid compound of alumina, but the chlorid is usually more expensive than the sulfate. For some purposes, iron salts can be used instead of aluminum salts in making zeolites of adjusted silica content.

What I claim is:

1. In making water-softening zeolite gels from aluminum sulfate, sodium silicate and sodium aluminate solutions, the process which comprises mixing sulfate and silicate solutions of concentrations exceeding 3° Baumé, separately mixing aluminate and silicate solutions of concentrations exceeding 5° Baumé and then mixing these two mixtures of said solutions.

2. In making water-softening zeolites from aluminum sulfate, sodium silicate and sodium aluminate solutions, the process of adjusting the silica ratio of the product which comprises mixing sulfate and silicate solutions, separately mixing aluminate and silicate solutions and mixing these two mixtures, the amounts of alumina supplied by the sulfate and aluminate respectively being in a molecular ratio between 1:0.5 and 1:7.

3. The process of making water-softening zeolite gels of adjusted silica content which comprises mixing a solution of commercial water glass with aluminum sulfate solution, mixing another solution of commercial water glass with sodium aluminate solution and then combining the first named mixture with the second named mixture and permitting the final mixture to set to a jelly.

4. The process of making water-softening zeolites of adjusted silica content which comprises mixing a solution of commercial water glass with aluminum sulfate solution, mixing another solution of commercial water glass with sodium aluminate solution and combining the two mixtures, adjusting the relative proportions of sodium silicate in the water glass of the two mixtures to give a predetermined silica ratio in the product less than 13 mols $SiO_2$ to one each of $Al_2O_3$ and $Na_2O$.

5. The process of making water-softening zeolites which comprises mixing a solution of sodium silicate with one of aluminum sulfate, mixing another solution of sodium silicate with one of sodium aluminate and combining the two mixtures, adjusting the relative proportions of silicate, sulfate and aluminate to give in the final mixture an excess of $Na_2O$ over the quantity required to form $Na_2SO_4$ with the $SO_3$ of the sulfate and to supply one mol $Na_2O$ for each mol $Al_2O_3$ in the mixture.

6. The process of making water-softening zeolite gels of adjusted silica content from commercial sodium silicate containing upwards of 3 mols $SiO_2$ to one of $Na_2O$ which comprises reacting in solution to form a jelly a quantity of said sodium silicate with aluminum sulfate and with a mixture of sodium aluminate and caustic soda, adjusting the relative amounts of sulfate and of aluminate and caustic to give the gel product a silica ratio between 5 and 7 molecules $SiO_2$ to one each of $Al_2O_3$ and $Na_2O$.

7. The method of lowering the silica ratio in water-softening zeolites made from aluminum sulfate and sodium silicate solutions, which comprises adding the sulfate solution to the silicate solution in quantity insufficient to neutralize the alkali of said silicate, adding caustic soda solution to the silicate-sulfate mixture, then more sulfate solution and maintaining the mixture alkaline by adding portions of caustic soda in alternation with portions of sulfate solution.

8. In making water-softening zeolites from sodium silicate and both aluminum sulfate and sodium aluminate, the process which comprises neutralizing with an acid the alkali of a sodium silicate solution, mixing solutions of aluminum sulfate and of sodium silicate with the neutralized silicate solution and mixing said mixture with a mixture of sodium silicate and sodium aluminate solutions.

9. In making water-softening zeolites from sodium silicate and both aluminum sulfate and sodium aluminate, the process which comprises mixing silicate and sulfate solutions of such concentrations that gel formation is delayed, mixing silicate and aluminate solutions of such concentration that gel formation is delayed and mixing these two mixtures.

10. A process of making base exchange zeolite gels which comprises making a mixture of sodium silicate and sodium aluminate solutions and stirring into said mixture a mixture of sodium silicate and aluminum sulfate solutions.

11. A process of making base exchange zeolite gels which comprises making a mixture of sodium silicate and sodium aluminate solutions and stirring into said mixture a mixture of sodium silicate and aluminum sulfate solutions, allowing the final mixture to stand and drying the resulting gel.

12. In the manufacture of base exchange zeolites adapted to continued use in regenerative water softening operations, a process which comprises making a mixture of sodium silicate and sodium aluminate solutions, making another and alkaline mixture of sodium silicate and aluminum sulfate solutions and then combining said two mixtures.

13. In the manufacture of base exchange zeolites adapted for continued use in regenerative water softening operations, a process which comprises making from sodium silicate and aluminum sulfate solutions a mixture of said solutions alkaline to methyl orange, making a separate mixture of sodium silicate and sodium aluminate solutions and then combining said two mixtures.

In testimony whereof, I have hereunto affixed my signature.

WILLIAM McAFEE BRUCE.

---

Certificate of Correction

Patent No. 1,906,203.     April 25, 1933.

WILLIAM McAFEE BRUCE

It is hereby certified that error appears in the printed specification of the above-numbered patent requiring correction as follows: Page 1, line 22, for " alumniate " read *aluminate*; page 2, line 102, for " alkili " read *alkali*; page 3, line 95, for " $Na_3Al_2O_3$ " read *$Na_3AlO_3$*; page 4, line 8, for " ration " read *ratio*; line 59, for "silicate" read *silica*, and line 80, for " siliate " read *silicate*; and that the said Letters Patent should be read with these corrections therein that the same may conform to the record of the case in the Patent Office.

Signed and sealed this 30th day of May, A. D. 1933.

[SEAL]
                                           M. J. MOORE,
*Acting Commissioner of Patents.* solution and mixing said mixture with a mixture of sodium silicate and sodium aluminate solutions.

9. In making water-softening zeolites from sodium silicate and both aluminum sulfate and sodium aluminate, the process which comprises mixing silicate and sulfate solutions of such concentrations that gel formation is delayed, mixing silicate and aluminate solutions of such concentration that gel formation is delayed and mixing these two mixtures.

10. A process of making base exchange zeolite gels which comprises making a mixture of sodium silicate and sodium aluminate solutions and stirring into said mixture a mixture of sodium silicate and aluminum sulfate solutions.

11. A process of making base exchange zeolite gels which comprises making a mixture of sodium silicate and sodium aluminate solutions and stirring into said mixture a mixture of sodium silicate and aluminum sulfate solutions, allowing the final mixture to stand and drying the resulting gel.

12. In the manufacture of base exchange zeolites adapted to continued use in regenerative water softening operations, a process which comprises making a mixture of sodium silicate and sodium aluminate solutions, making another and alkaline mixture of sodium silicate and aluminum sulfate solutions and then combining said two mixtures.

13. In the manufacture of base exchange zeolites adapted for continued use in regenerative water softening operations, a process which comprises making from sodium silicate and aluminum sulfate solutions a mixture of said solutions alkaline to methyl orange, making a separate mixture of sodium silicate and sodium aluminate solutions and then combining said two mixtures.

In testimony whereof, I have hereunto affixed my signature.

WILLIAM McAFEE BRUCE.

Certificate of Correction

Patent No. 1,906,203.  April 25, 1933.

WILLIAM McAFEE BRUCE

It is hereby certified that error appears in the printed specification of the above-numbered patent requiring correction as follows: Page 1, line 22, for " alumniate " read *aluminate*; page 2, line 102, for " alkili " read *alkali*; page 3, line 95, for " $Na_3Al_2O_3$ " read $Na_3AlO_3$; page 4, line 8, for " ration " read *ratio*; line 59, for "silicate" read *silica*, and line 80, for " siliate " read *silicate*; and that the said Letters Patent should be read with these corrections therein that the same may conform to the record of the case in the Patent Office.

Signed and sealed this 30th day of May, A. D. 1933.

[SEAL]

M. J. MOORE,
*Acting Commissioner of Patents.*

Certificate of Correction

Patent No. 1,906,203.　　　　　　　　　　　　　　　　　　　　　　　April 25, 1933.

WILLIAM McAFEE BRUCE

It is hereby certified that error appears in the printed specification of the above-numbered patent requiring correction as follows: Page 1, line 22, for " alumniate " read *aluminate*; page 2, line 102, for " alkili " read *alkali*; page 3, line 95, for " $Na_3Al_2O_3$ " read *$Na_3AlO_3$*; page 4, line 8, for " ration " read *ratio*; line 59, for "silicate " read *silica*, and line 80, for " siliate " read *silicate*; and that the said Letters Patent should be read with these corrections therein that the same may conform to the record of the case in the Patent Office.

Signed and sealed this 30th day of May, A. D. 1933.

[SEAL]　　　　　　　　　　　　　　　　　　　　　　　　　　　　M. J. MOORE,
　　　　　　　　　　　　　　　　　　　　　　　　　　　　*Acting Commissioner of Patents.*